United States Patent
Yoo et al.

(10) Patent No.: US 11,075,443 B2
(45) Date of Patent: Jul. 27, 2021

(54) ELECTRONIC DEVICE WITH ANTENNA DEVICE

(71) Applicant: Samsung Electronics Co., Ltd., Suwon-si (KR)

(72) Inventors: Jang-Sun Yoo, Seoul (KR); Ji-Hye Moon, Hwaseong-si (KR); Myeong-Gil Lee, Suwon-si (KR); Chee-Hwan Yang, Yongin-si (KR); Kwang-Yong Lee, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 181 days.

(21) Appl. No.: 15/911,768

(22) Filed: Mar. 5, 2018

(65) Prior Publication Data
US 2018/0254540 A1 Sep. 6, 2018

(30) Foreign Application Priority Data

Mar. 2, 2017 (KR) .................. 10-2017-0027009

(51) Int. Cl.
*H01Q 1/24* (2006.01)
*G06F 1/16* (2006.01)
(Continued)

(52) U.S. Cl.
CPC ........... *H01Q 1/243* (2013.01); *G06F 1/1616* (2013.01); *G06F 1/1681* (2013.01);
(Continued)

(58) Field of Classification Search
CPC ...... H01Q 1/243; H01Q 1/084; H01Q 1/2266; H01Q 9/0421; G06F 1/1683;
(Continued)

(56) References Cited

U.S. PATENT DOCUMENTS

2001/0040529 A1  11/2001  Cheng et al.
2004/0142735 A1   7/2004  Yi
(Continued)

FOREIGN PATENT DOCUMENTS

CN   103904419 A    7/2014
CN   203932299 U   11/2014
(Continued)

OTHER PUBLICATIONS

Extended Search Report dated Dec. 6, 2019, issued in a counterpart European application No. 18760493.9-1216 / 3563451.
(Continued)

*Primary Examiner* — Awat M Salih
(74) *Attorney, Agent, or Firm* — Jefferson IP Law, LLP

(57) ABSTRACT

An electronic device including an antenna is provided. The electronic device includes a first housing, a second housing for rotatably combining with the first housing, at least one hinge assembly configured to at least partially include an electric conductor portion, the at least one hinge assembly for rotatably coupling the second housing to the first housing, and at least one antenna device coupled to the at least one hinge assembly, in which the at least one antenna device includes a radiating conductor pattern and a ground patch, and the ground patch is electrically connected to the electric conductor portion of the at least one hinge assembly.

21 Claims, 10 Drawing Sheets

(51) Int. Cl.
*H01Q 7/00* (2006.01)
*H01Q 1/22* (2006.01)
*H01Q 9/04* (2006.01)
*H01Q 1/08* (2006.01)

(52) U.S. Cl.
CPC .......... *G06F 1/1683* (2013.01); *G06F 1/1698* (2013.01); *H01Q 1/084* (2013.01); *H01Q 1/2266* (2013.01); *H01Q 7/00* (2013.01); *H01Q 9/0421* (2013.01)

(58) Field of Classification Search
CPC .... G06F 1/1681; G06F 1/1698; G06F 1/1616; G06F 1/1618
See application file for complete search history.

(56) References Cited

U.S. PATENT DOCUMENTS

| | | | | |
|---|---|---|---|---|
| 2004/0212956 | A1* | 10/2004 | Kuivas | H04M 1/022 361/679.06 |
| 2006/0071863 | A1 | 4/2006 | Lindell | |
| 2009/0061967 | A1 | 3/2009 | Matsuda | |
| 2009/0096708 | A1 | 4/2009 | Yoon et al. | |
| 2011/0063175 | A1* | 3/2011 | Uno | H01Q 1/243 343/702 |
| 2011/0285647 | A1* | 11/2011 | Imamura | G06F 1/1647 345/173 |
| 2012/0086610 | A1 | 4/2012 | Nishikido et al. | |
| 2014/0292613 | A1 | 10/2014 | Hsiao et al. | |
| 2015/0084816 | A1* | 3/2015 | Kurose | H01Q 1/526 343/702 |
| 2015/0102966 | A1 | 4/2015 | Chiu et al. | |
| 2015/0311579 | A1* | 10/2015 | Irci | H01Q 1/243 343/702 |
| 2016/0099495 | A1 | 4/2016 | Chiu et al. | |
| 2017/0145725 | A1* | 5/2017 | Siddiqui | E05D 5/10 |
| 2017/0212554 | A1* | 7/2017 | Guterman | G06F 1/1616 |

FOREIGN PATENT DOCUMENTS

| | | |
|---|---|---|
| CN | 104377435 A | 2/2015 |
| JP | 2015-018524 A | 1/2015 |
| KR | 10-2008-0022641 A | 3/2008 |
| KR | 10-2009-0037647 A | 4/2009 |

OTHER PUBLICATIONS

Chinese Office Action dated Jul. 20, 2020, issued in Chinese Application No. 201880010371.4.
Li et al, "Design of a Vehicular or Portable Satellite Communication Device", Machinery & Electronics, vol. 34, No. 8., Aug. 24, 2016.
Chinese office action dated Apr. 6, 2021, issued in Chinese application No. 201880010371.4.

* cited by examiner

ELECTRONIC DEVICE WITH ANTENNA DEVICE

CROSS-REFERENCE TO RELATED APPLICATION(S)

This application is based on and claims priority under 35 U.S.C. § 119 of a Korean Patent Application Ser. No. 10-2017-0027009, filed on Mar. 2, 2017, in the Korean Intellectual Property Office, the disclosure of which is incorporated by reference herein in its entirety.

TECHNICAL FIELD

The disclosure relates to an electronic device. More particularly, the disclosure relates to an electronic device with an antenna device.

BACKGROUND

In general, the term 'electronic device may be used having a meaning that includes devices that allow for a communication function such as telephone communication or transmission of short messages, a multimedia function such as playing of music or video, and an entertainment function such as playing of games. The electronic devices may include a desktop computer that is used in a house or an office and a laptop computer improving portability and spatial usability for general use environments including a house or an office.

Some of the electronic device can connect to wireless communication networks that can be freely used, while some of the electronic device can connect only to limited wireless communication networks (for example, Bluetooth and a wireless local area network (WLAN)). For example, the electronic device such as a laptop computer can connect to a wireless access point (AP) that is provided within a limited area such as a wireless LAN or connect to a common communication network by sharing the function of connecting to a common communication network of a mobile communication terminal.

In general, users can use devices that can be easily carried such as a mobile communication terminal or a tablet personal computer (PC) in a mobile communication environment. In general, the performance of a mobile communication terminal or a tablet PC has developed to a point where such devices not approach the performance of a PC, but it is also possible to improve portable convenience of a PC, for example, a laptop computer by providing an input/output device having a sufficient size such as a keyboard and a display and reducing the weight and thickness.

In order to access not only common communication networks, but data communication including Bluetooth, a WLAN, and the internet, and wireless communication based on various communication regulations such as an internal of things (IoT) providing connection between devices, electronic devices may be equipped with several antenna devices that are operated in different frequency bands. In some case, an electronic device may be equipped with several antenna devices that are operated in the same frequency band to transmit data at a high speed and stably maintain wireless connection.

The above information is presented as background information only to assist with an understanding of the disclosure. No determination has been made, and no assertion is made, as to whether any of the above might be applicable as prior art with regard to the disclosure.

SUMMARY

A small size, light weight, and/or aesthetic external appearance may be the characteristics determining user selection of electronic devices, if specifications (for example, the data processing speed, the capacity of a memory, the data storage capacity, and the quality of input/output image or sound) are the same. For example, portable convenience and/or an external appearance may be important characteristics for selecting electronic devices. In accordance with this tendency, electronic devices are gradually reduced in size and weight and metallic materials are used for improving the external aesthetic appearance. It is difficult to secure a space for installing an antenna device in downsized and light-weighted electronic devices, and the metallic materials that are used for the external shapes of electronic devices may deteriorate the performance of an antenna device.

Aspects of the disclosure are to address at least the above-mentioned problems and/or disadvantages and to provide at least the advantages described below. Accordingly, an aspect of the disclosure is to provide an electronic device with an antenna device, the electronic device being able to have an aesthetic external appearance from a metallic material and to secure a stable wireless transmission/reception function.

In accordance with an aspect of the disclosure, an electronic device is provided. The electronic device includes a first housing, a second housing for rotatably combining with the first housing, at least one hinge assembly configured to at least partially include an electric conductor portion, the at least one hinge assembly for rotatably coupling the second housing to the first housing, and at least one antenna device coupled to the at least one hinge assembly, in which the at least one antenna device includes a radiating conductor pattern and a ground patch, and the ground patch is electrically connected to the electric conductor portions of the at least one hinge assembly.

In an electronic device according to various embodiments, an antenna device is disposed on a hinge assembly, so an electric conductor portion of the hinge assembly can be used as a ground. For example, since the volume of an antenna device can be reduced, the antenna device can be manufactured in a smaller size than common antenna devices and can show the same or similar wireless transmission/reception performance. In an embodiment, when an antenna device of an electronic device according to various embodiment is manufactured in a size the same as or similar to those of common antenna devices, it can contribute to improving wireless transmission/reception performance.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
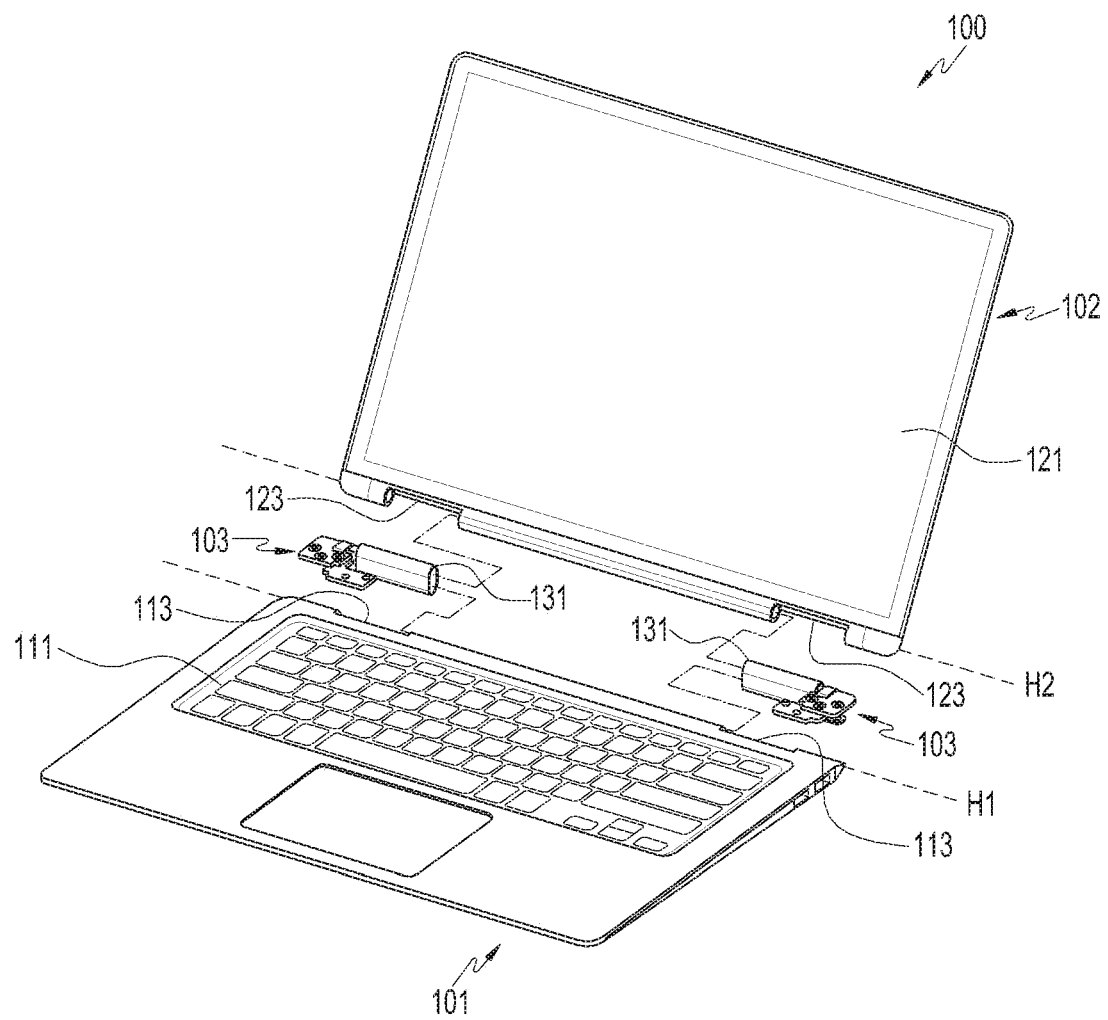
FIG. 1 is an exploded perspective view showing an electronic device according to various embodiments of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, singular forms may include plural forms as well unless the context clearly indicates otherwise. The expression "a first", "a second", "the first", or "the second" used in various embodiments of the disclosure may modify various components regardless of the order and/or the importance but does not limit the corresponding components. When an element (e.g., first element) is referred to as being "(functionally or communicatively) connected," or "directly coupled" to another element (second element), the element may be connected directly to the another element or connected to the another element through yet another element (e.g., third element).

The expression "configured to" as used in various embodiments of the disclosure may be interchangeably used with, for example, "suitable for", "having the capacity to", "designed to", "adapted to", "made to", or "capable of" in terms of hardware or software, according to circumstances. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

An electronic device according to various embodiments of the disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a Moving Picture Experts Group phase 1 or phase 2 (MPEG-1 or MPEG-2) audio layer-3 (MP3) player, a mobile medical device, a camera, and a wearable device. According to various embodiments, the wearable device may include at least one of an accessory type (e.g., a watch, a ring, a bracelet, an anklet, a necklace, a pair of glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit). In some embodiments, the electronic device may include at least one of, for example, a television, a digital video disc (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

In other embodiments, the electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.). According to some embodiments, an electronic device may include at least one of a part of furniture or a building/structure, an electronic board, an electronic signature receiving device, a projector, and various types of measuring instruments (e.g., a water meter, an electric meter, a gas meter, a radio wave meter, and the like). In various embodiments, the electronic device may be flexible, or may be a combination of one or more of the aforementioned various devices. The electronic device according to one embodiment of the disclosure is not limited to the above described devices. In the disclosure, the term "user" may indicate a person using an electronic device or a device (e.g., an artificial intelligence electronic device) using an electronic device.

FIG. 1 is an exploded perspective view showing an electronic device according to various embodiments of the disclosure.

Referring to FIG. 1, an electronic device 100 according to various embodiments is, for example, a laptop computer including a first housing 101 and a second housing 102 that are coupled to each other to be rotatable with respect to each other and may include one or more hinge assemblies 103 rotatably coupling the first housing 101 and the second housing 102. Though will be described below, the electronic device 100 may include antenna devices 104 disposed on the hinge assemblies 103 (for example an antenna device 104 shown in FIG. 2).

According to various embodiments, the first housing 101 may receive a main board, a battery pack, etc. therein, and may include a keyboard 111 or a touch pad that is an input device. In an embodiment, the first housing 101 may include a power connector for connection with an external power and slots for mounting storage devices or external memories.

In an embodiment, the second housing 102 may include a display device 121 disposed on a side, and depending on embodiments, a camera module (e.g., a camera), a proximity and luminance sensor, a hall sensor, etc. may be disposed in the second housing 102. In an embodiment, the second housing 102 may be rotatably coupled to the first housing 101 through the hinge assembly 103. For example, the second housing 102 can be rotated and unfolded away from the first housing 101 to a predetermined angle from a folded position where it faces the first housing 101.

According to various embodiments, the hinge assembly 103 may provide a first hinge axis H1 rotatably coupled to the first housing 101 and a second hinge axis H2 rotatably coupled to the second housing 102 and disposed in parallel with the first hinge axis H1. For example, the second housing 102 can be folded toward the first housing 101 or unfolded away from the first housing 101 by rotating about the first hinge axis H1 and/or the second hinge axis H2.

In an embodiment, the hinge assembly 103 can rotate about the first hinge axis H1 within the angular range of 180 degrees with respect to the first housing 101 and the second housing 102 can rotate about the second hinge axis H2 within the angular range of 180 degrees with respect to the hinge assembly 103. For example, the second housing 102 can rotate within the angular range of 360 degrees from the position folded over the first housing 101. In an embodiment, the second housing 102 can be folded over the first housing 101 with the display device 121 facing the keyboard 111 and can be folded over the first housing 101 with the display device 121 turned over in the opposite direction to the keyboard 111.

Figure 2:
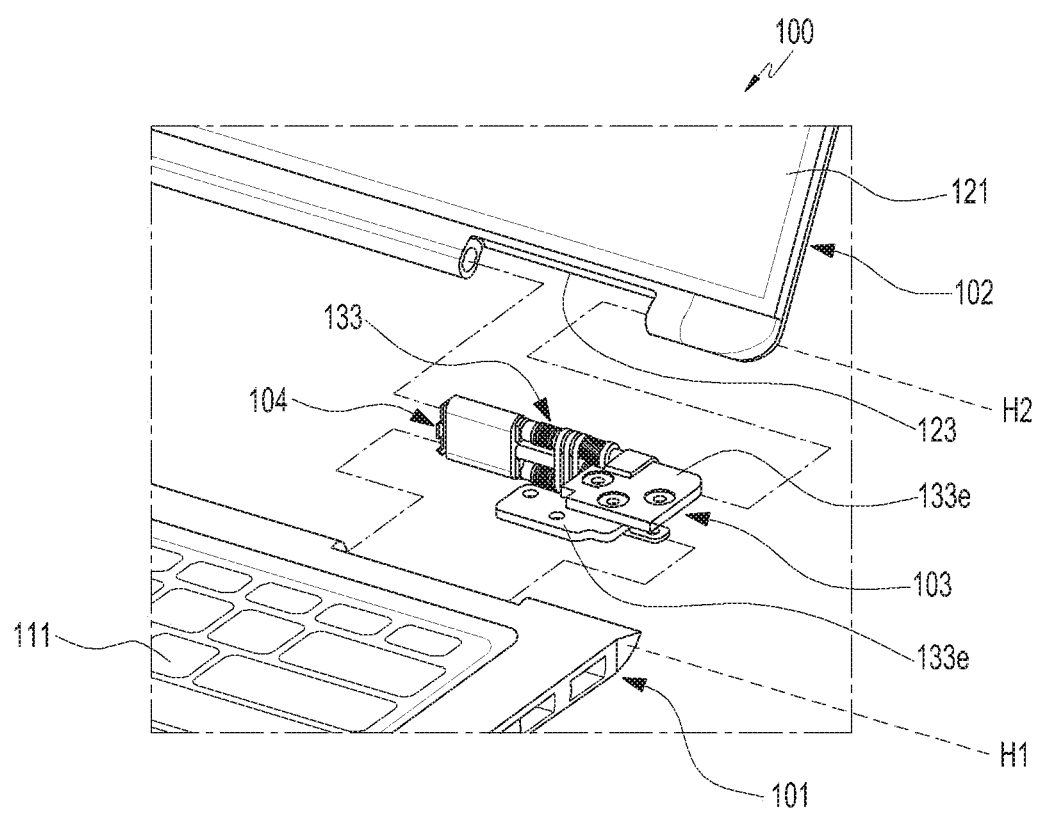
FIG. 2 is an exploded perspective view enlarging a portion of the electronic device according to various embodiments of the disclosure.

FIG. 2 is an exploded perspective view enlarging a portion of the electronic device 100 according to various embodiments of the disclosure.

Referring to FIG. 2, the configuration of coupling the second housing 102 to the first housing 101 through the hinge assemblies 103 is described with reference to FIG. 2.

According to various embodiments, the hinge assembly 103 may include at least one antenna device 104 coupled to at least one hinge module 133. According to an embodiment, the hinge assembly 103 may include at least one casing 131 receiving the hinge module 133 or the antenna device 104. It should be noted that the hinge modules 133 and the antenna devices 104 are received in the casings 131 in FIG. 1 and the casing 131 are not shown in FIG. 2 to show arrangement of the hinge modules 133 and the antenna devices 104. The casing 131, for example, may be a hinge cover.

According to an embodiment, the hinge module 133 may include a pair of fastening members 133e and the fastening members 133e can rotate about any one of the first hinge axis H1 and the second hinge axis H2 of the hinge assembly 103. In an embodiment, one of the fastening members 133e may be coupled to the first housing 101 and the other one may be coupled to the second housing 102. For example, the hinge assembly 103 may be coupled to the first housing 101 and the second housing 102 through the fastening members 133e, and the first housing 101 and/or second housing 102 can rotate about the first hinge axis H1 and/or the second hinge axis H2. In an embodiment, the hinge module 133 may have a structure allowing the second housing 102 to rotate 360 degrees with respect to the first housing 101.

In another embodiment, the hinge assembly 103, for example, the hinge module 133 may at least partially have an electric conductor portion and the electric conductor portion of the hinge assembly 103 may provide a ground to the antenna device 104. In an embodiment, the antenna device 104 may be disposed on the hinge assembly 103. For example, the antenna device 104 can be received together with the hinge module 133 in the casing 131 and can be electrically connected to the electric conductor portion of the hinge assembly 103. According to an embodiment, the casing 131 may be made of synthetic resin to transmit wireless electric waves that are transmitted and received through the antenna device 104.

According to various embodiments, a portion of the hinge assembly 103 may be received in a first hinge groove 113 formed on the first housing 101 and the other portion of the hinge assembly 103 may be received in a second hinge groove 123 formed on the second housing 102. Since the hinge assembly 103 is coupled to the first housing 101 and the second housing 102, the first hinge axis H1 may be disposed on an edge of the first housing 101 and the second hinge axis H2 may be disposed on a first edge of the second housing 102.

Figure 3:
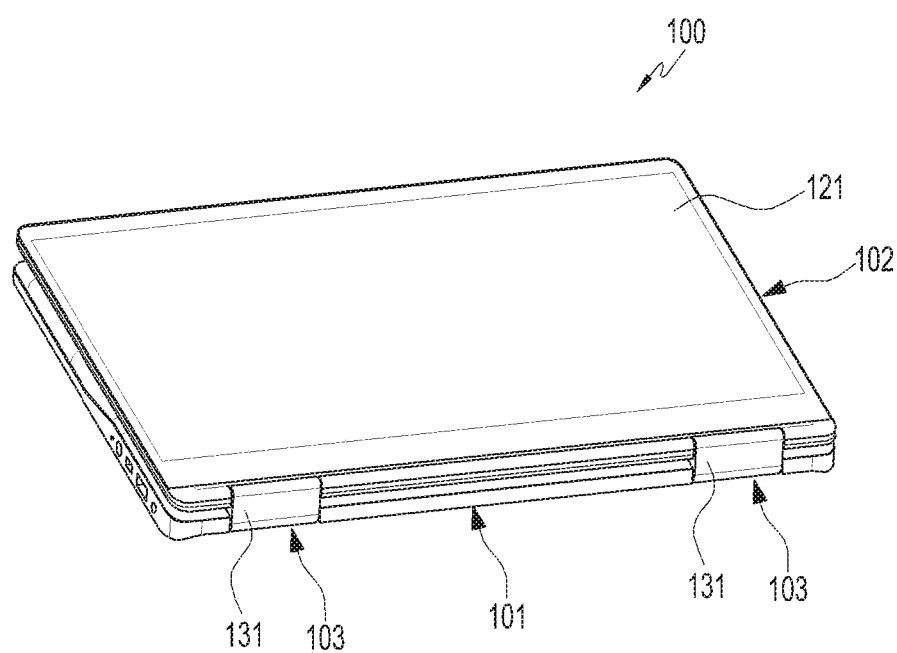
FIG. 3 is a perspective view showing the electronic device according to various embodiments of the disclosure.

FIG. 3 is a perspective view showing the electronic device 100 according to various embodiments of the disclosure.

Referring to FIG. 3, the second housing 102 can be folded over the first housing 101. For example, the second housing 102 can be folded over the first housing 101 with the display device 121 facing the keyboard 111. With the second housing 102 folded over the first housing 101, the hinge assemblies 103 and/or the casings 131 may be partially exposed on an edge of the first housing 101 and/or the second housing 102.

According to various embodiments, from the position folded over the first housing 101, the second housing 102 can be rotated and unfolded at 180 degrees with respect to first housing 101 about the first hinge axis H1 together with the hinge assemblies 103. From the position rotated and unfolded at 180 degrees with respect to the first housing 101, the second housing 102 can be rotated 180 degrees with respect to the hinge assemblies 103 about the second hinge axis H2. For example, the second housing 102 can rotate 360 degrees with respect to the first housing 101, and as shown in FIG. 3, the keyboard 111 and the display device 121 may be positioned in opposite directions. Even though the second housing 102 is folded over the first housing 101 with the keyboard 111 and the display device 121 positioned in opposite directions, portions of the hinge assembly 103, for example, the portions where the antenna devices 104 are disposed can be exposed on the edge of the first housing 101 and/or the second housing 102. With the keyboard 111 and the display device 121 positioned in opposite directions, a user can use the electronic device like a common tablet PC.

According to an embodiment, the second housing 102 can be rotate about the first housing 101 and/or the hinge assemblies 103 and be stopped at a predetermined angle with respect to the first housing 101. For example, a user can adjust the second housing 102 at a predetermined angle with respect to the first housing 101 to conveniently use the electronic device 100. With the second housing 102 positioned at an angle with respect to the first housing 101, the hinge assemblies 103 can be exposed between the first housing 101 and the second housing 102.

As described above, the hinge assemblies 103 can be at least partially exposed to free space regardless of the position of the second housing 102 relative to the first housing 101. For example, the antenna devices 104 are received in the casing 131, but the casings 131 can transmit wireless electric waves, so a stable operation environment can be created for the antenna devices 104. According to an embodiment, when the first housing 101 and/or the second housing 102 are made of a metallic material, the aesthetic external appearance of the electronic device 100 can be improved, but the operation environment of the antenna devices 104 may be deteriorated. In electronic device according to various embodiments (for example, the electronic device 100 shown in FIGS. 1 to 3), the antenna devices 104 are disposed on the hinge assemblies 103 and can at least partially radiate wireless electric waves to the free space, so a stable operation environment can be secured.

The configuration, in which when the second housing 102 is rotated 360 degrees from the position folded over the first housing 101, the hinge assemblies 103 are rotated first with respect to the first housing 101 and the second housing 102 is rotated with respect to the first housing 101, was described above in detail with reference to an embodiment. However, the configuration does not limit the disclosure. For example, rotation of the hinge assemblies 103 with respect to the first housing 101 and rotation of the second housing 102 with respect to the hinge assemblies 103 may be simultaneously performed. This configuration can be implemented in various ways by the structure of the hinge assemblies 103. An embodiment in which the antenna device 104 is connected to an electric conductor portion in the hinge assembly 103 is described hereafter together with one of various embodiments of the hinge assembly 103 with respect to FIG. 4 etc.

Figure 4:
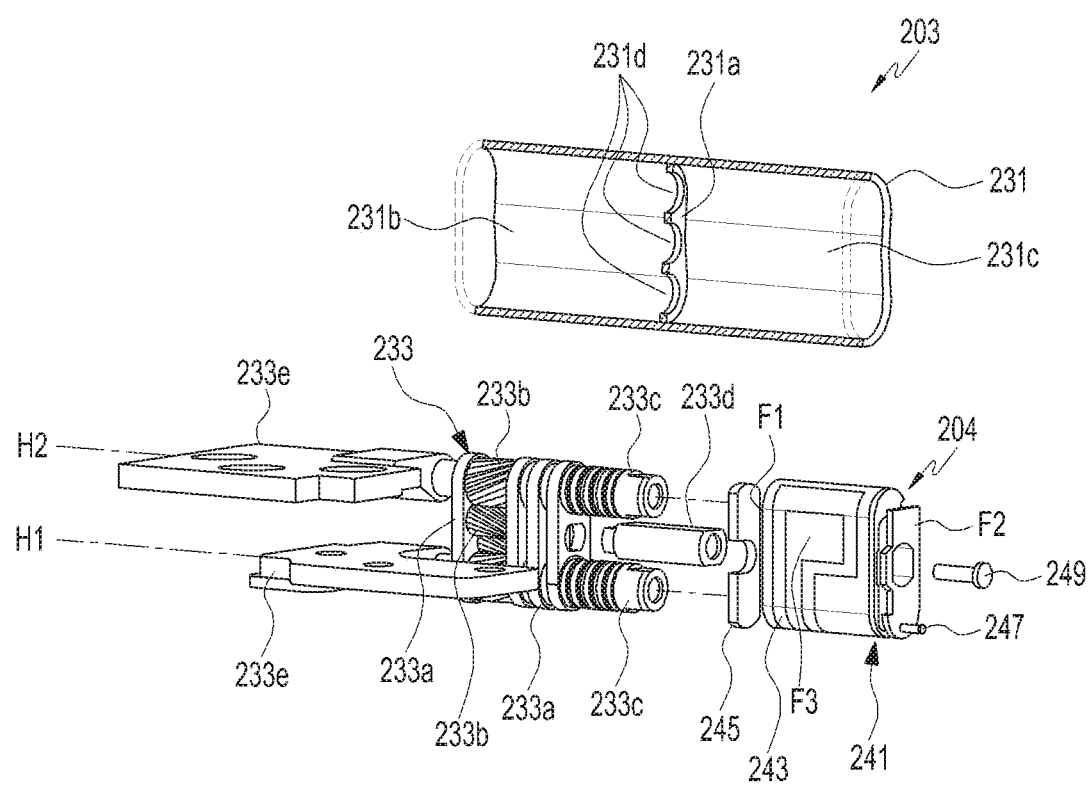
FIG. 4 is an exploded perspective view showing a hinge assembly of an electronic device according to various embodiments of the disclosure.
Figure 5:
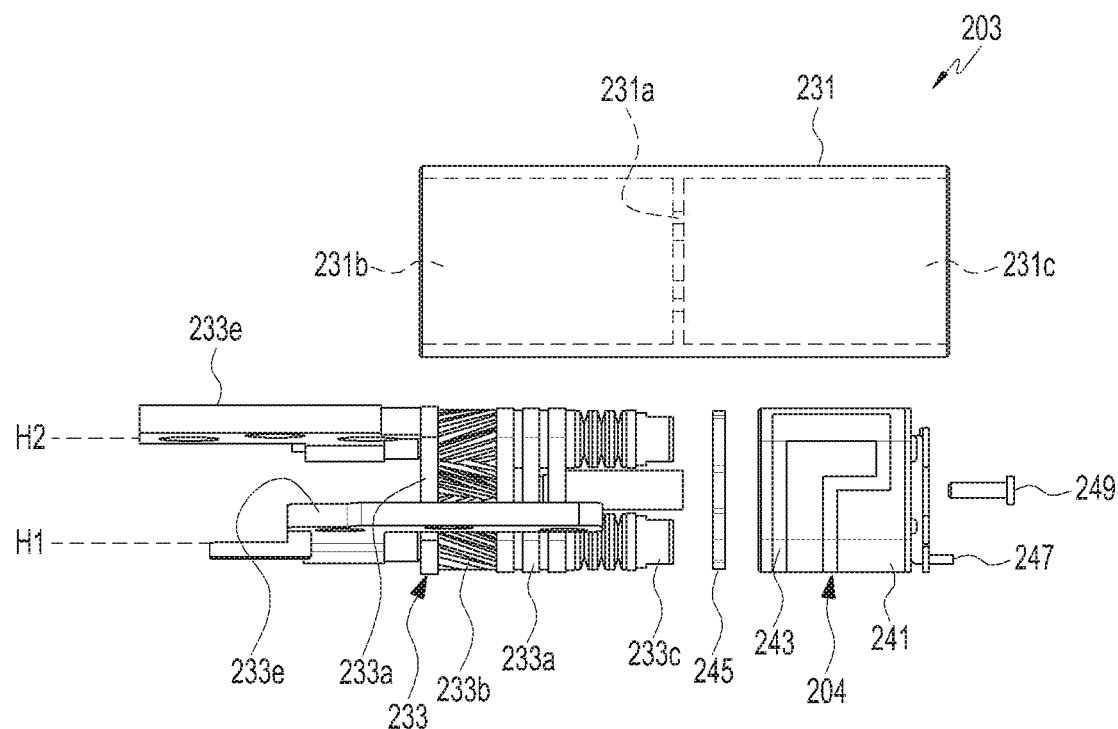
FIG. 5 is a plan view separately showing the hinge assembly of an electronic device according to various embodiments of the disclosure.

FIG. 4 is an exploded perspective view showing a hinge assembly 203 of an electronic device according to various embodiments of the disclosure. FIG. 5 is a plan view separately showing the hinge assembly 203 of an electronic device according to various embodiments of the disclosure.

Referring to FIGS. 4 and 5, the hinge assembly 203 (for example, the hinge assembly 103 shown in FIG. 1 and/or FIG. 2) includes a casing 231 (for example, the casing 131 shown in FIG. 1), a hinge module 233 (for example, the hinge module 133 shown in FIG. 2), in which an antenna device 204 (for example, the antenna device 104 shown in FIG. 2) may be disposed on the hinge device 203 and electrically connected to an electric conductor portion of the hinge assembly 203.

According to various embodiments, the casing 231 may be made of synthetic resin in a tube shape extending in a direction (for example, in the direction of the first hinge axis H1 and/or the second hinge axis H2 described above), and has a separation wall 231a therein, so the inside of the casing 231 can be divided into a first space 231b and a second space 231c. For example, the first space 231b and the second space 231c may be sequentially arranged in the direction of the first hinge axis H1 and/or the second hinge axis H2, and the first space 231b may be open to a first end of the casing 231 and the second space 231c may be open to a second end of the casing 231.

In an embodiment, several holes 231d may be formed through the separation wall 231a. The holes 231d may be formed to contribute to mounting and fixing hinge module 233. In an embodiment, at least one of the holes 231d may provide a path connecting the antenna device 204 to the electric conductor portion of the hinge assembly 203 and/or the hinge module 233. The expression 'connecting an antenna device to an electric conductor portion may mean that a ground provided to the antenna device 204 is electrically and/or mechanically connected to the electric conductor portion of the hinge module 233. For example, the electric conductor portion of the hinge assembly 203 and/or the hinge module 233 can actually contribute to expanding the ground of the antenna device 204 by be connected to the ground of the antenna device 204. The antenna device 204 secures an expanded ground through the electric conductor portion of the hinge module 203, whereby it can be downsized in comparison to common antenna devices that show the same or similar performance and can be improved in radiation performance (for example, radiation efficiency) or radiation characteristic, as compared with common antenna devices having the same or similar size (for example, volume).

According to various embodiments, at least a portion, for example, the electric conductor portion of the hinge module 233 can be received in the first space 213b, and the hinge module 233 may have at least a pair of assembling pieces 233a and several gears 233b. In an embodiment, some or all of each of the assembling pieces 233a and/or the gears 233b may be made of an electrically conductive material. The gears 233b may be assembled to be rotatable between the assembling pieces 233a and engaged with each other through gear teeth such that when one of the gears 233b is rotated, the others are correspondingly rotated.

According to various embodiments, any one of the gears 233b may be disposed to rotate about the first hinge axis H1 and another one may be disposed to rotate about the second hinge axis H2. In an embodiment, the hinge module 233 may further include fastening members 233e (for example, the fastening members 133e shown in FIG. 2). One of the fastening members 233e may be coupled to the gear rotating about the first hinge axis H1 of the gears 233b and the other one may be coupled to the gear rotating about the second hinge axis H2. For example, when one of the fastening members 233e is rotated about the assembling pieces 233a, the other one can also be rotated about the assembling pieces 233a.

In an embodiment, the hinge module 233 may have at least one or more coupling protrusions 233c protruding from an end thereof. The coupling protrusions 233c are fitted in one of the holes 231d, whereby they can fix the hinge module 233 to the casing 231. When the hinge module 233 is coupled and fixed to the casing 231, the assembling pieces 233e and/or the gears 233b can be received in the first space 231b and the fastening members 233e can be exposed out of the first end of the casing 231. For example, the fastening members 233e may be coupled to the first housing 101 and/or the second housing 102 of the electronic device (for example, the electronic device 100 shown in FIG. 1).

According to various embodiments, the hinge assembly 203 and/or the hinge module 233 may further include a connecting member 233d. For example, the connecting member 233d may be disposed at an end of the hinge module 233 through the separation wall 231a through another one of the holes 231d. The connecting member 233d may be made of an electrically conductive material and may be brought in contact with the ground of the antenna device 204 (for example, a ground patch 245 to be described below). For example, the ground of the antenna device 204 is brought in contact with the connecting member 233d, whereby it can be electrically connected to the electric conductor portion of the hinge module 233 (for example, the assembling pieces 233a and/or the gears 233b) through the connecting member 233d. Accordingly, the ground of the antenna device 204 can be expanded at least by the connecting member 233d, and if the assembling pieces 233a and/or the gears 233b are made of an electrically conductive material, the ground of the antenna device 204 can be more expanded.

According to various embodiments, the antenna device 204 may be at least partially received in the second space 231c and may include a radiating conductor pattern 243 and a ground patch 245. The radiating conductor pattern 243, for example, may have a planar inverted-F antenna (PIFA) structure. In an embodiment, the radiating conductor pattern 243 and/or the ground patch 245 may be disposed or formed in the second space 231c. In another embodiment, the radiating conductor pattern 243 and/or the ground patch 245 may be disposed or formed on the inner side of the second space 231c. For example, the radiating conductor pattern 243 and/or the ground patch 245 may be formed by attaching a thin metal plate to the inner side of the second space 231c or by printing, plating, or depositing a conductive material to the inner side of the second space 231c. However, in a detailed embodiment, the antenna device 204 may further include a radiating carrier 241 and the radiating conductor pattern 243 may be at least partially disposed or formed on a side of the radiating carrier 241.

According to various embodiments, the radiating carrier 241 is manufactured by forming synthetic resin and may have a first surface F1, a second surface F2 spaced from the first surface F1 opposite to the first surface F1, and a side F3 at least partially surrounding the space between the first surface F1 and the second surface F2. When the antenna device 204 is received in the casing 231 (for example, the second space 231c), the first surface F1 can be positioned to face the electric conductor potion of the hinge assembly 203 (and/or the hinge module 233). In an embodiment, the first surface F1 may be disposed to face the separation wall 231.

When the second surface F2 may be positioned at an open end of the casing 231 with the radiating carrier 241 received in the second space 231c. In an embodiment, a connection member 247 (for example, a coaxial connector) may be disposed on the second surface F2. For example, the antenna device 204 can be connected to a radio frequency module etc. of the electronic device (for example, the electronic device 100 shown in FIG. 1) through the connection member 247.

In an embodiment, the radiating conductor pattern 243 may be formed on a side of the radiation carrier 241 by attaching a thin plate made of an electrically conductive material, or depositing or printing a conductive material. The shape or the electrical length of the radiating conductor pattern 243 may be appropriately designed in accordance with the frequency band of electric waves to be transmitted and received through the antenna device 204. In an embodiment, the shape of the radiating carrier 241 may be formed to approximately correspond to the shape of the second space 231c. In another embodiment, a portion of a side of the radiating carrier 241 (for example, the area where the radiating conductor pattern 243 is formed) may be recessed. For example, the radiating conductor pattern 243 is disposed in the recessed area on the side of the radiating carrier 241, whereby it may not generate friction with other structures while the radiating carrier 241 is combined with the casing 231. Accordingly, it is possible to prevent from damaging the radiating conductor pattern 243 while the radiating carrier 241 is combined with the casing 231.

In an embodiment, the ground patch 245 may be disposed or formed on the first surface F1 of the radiating carrier 241 by attaching a thin plate made of an electrically conductive material or electrically conductive rubber, or depositing or printing an electrically conductive material. The ground patch 245, for example, may be a gasket. For example, when the antenna device 204 is combined with the casing 231, the ground patch 245 may be positioned to face the separation wall 231a. The ground patch 245 may be in contact with the connecting member 233d and/or the coupling protrusion 233c in the second space 231c, so it can be electrically connected to the electric conductor portion the hinge assembly 203 (and/or the hinge module 233). For example, the connecting member 233d and/or the coupling protrusions 233c may be a portion of an electric conductor portion and can substantially expand the ground area of the antenna device 204 by being electrically connected to the ground patch 245.

According to various embodiments, the antenna device 204 may further include a fastener 249. The fastener 249 may be inserted in the radiating carrier 241 through the second surface F2 and pass the first surface F1. The fastener 249 may be fastened to the connecting member 233d outside the first surface F1. For example, the fastener 249 can stably maintain contact between the connecting member 233d and the ground patch 245 by retaining the connecting member 233d in the radiating carrier 241. In an embodiment, the fastener 249 fastens the radiating carrier 241 to the hinge module 233 with the separation wall 231a therebetween, whereby the hinge module 233 and the antenna device 204 can be fixed in the casing 231. In another embodiment, the fastener 249 may be fastened to the connecting member 233d through the ground patch 245. According to an embodiment, the ground patch 245 may have a hole through which the fastener 249 is inserted, and since the fastener 249 is fastened to the connecting member 233d, the ground patch 245 can be fixed between the connecting member 233d and the radiating carrier 241.

Figure 6A:
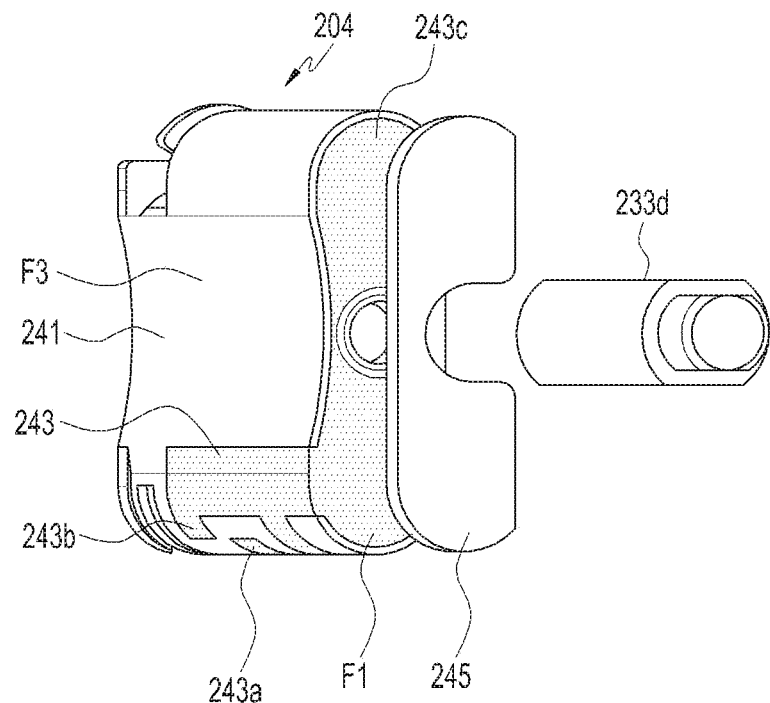
FIG. 6A is an exploded perspective view showing an antenna device of an electronic device according to various embodiments of the disclosure.

FIG. 6A is an exploded perspective view showing an antenna device of an electronic device according to various embodiments of the disclosure.

Referring to FIG. 6A, the antenna device (for example, the antenna device 204 shown in FIG. 4) may include the ground patch 245 disposed or formed on the first surface F1 of the radiating carrier 241 and can be brought in contact with the connecting member 233d in the casing of the hinge assembly (for example, the hinge assembly 203 shown in FIG. 4). The connecting member 233d may be made of an electrically conductive material and can connect the ground patch 245 to the electric conductor portion of the hinge module (for example, the hinge module 233 shown in FIG. 4). For example, when the ground patch 245 is connected to an electric conductor portion in the hinge assembly, the antenna device 204 can have a ground area substantially further expanded relative to the volume thereof. As the ground area is expanded, the antenna device 204 can secure more stable radiation performance, as compared with common antenna devices having the same or similar volume and can be down-sized in comparison to common antenna device having the same or similar radiation performance.

According to various embodiments, the radiating conductor pattern 243 may be partially positioned on the first surface F1 and/or the side F3 of the radiating carrier 241. For example, an area 243c allocated as a ground of the radiating conductor pattern 243 may be disposed on the first surface F1, and a power supply end 243a and/or a grounding end 243b may be disposed on the side F3. The ground area 243c, for example, may be disposed to correspond to the ground patch 245 and may have a shape corresponding to the ground patch 245. In an embodiment, a portion of the radiating conductor pattern 243 may be disposed on a first area defined in a predetermine direction and a second area defined in a direction different from the first area on the side F3. In another embodiment, a portion of the radiating conductor pattern 243 may be disposed on at least one area selected from the first area and the second area. In another embodiment, the connecting member 233d can be electrically connected to the radiating conductor pattern 243, for example, the ground area 243c by being brought in contact with the ground patch 245.

Figure 6B:
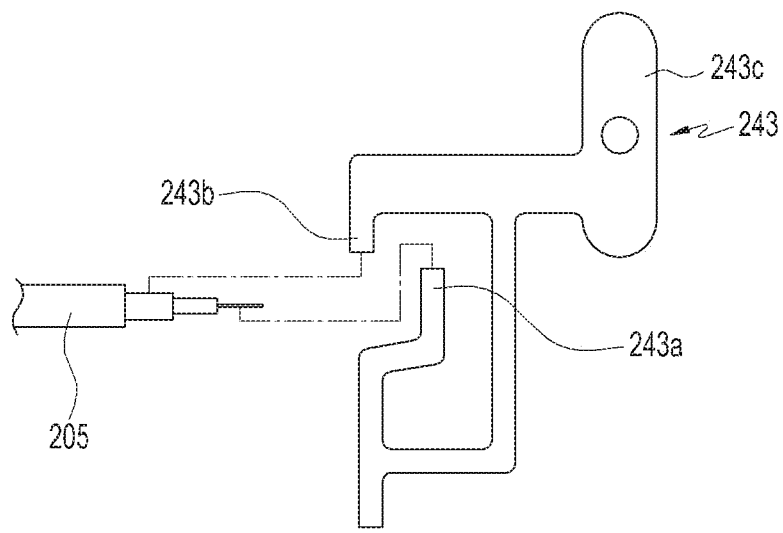
FIG. 6B is a development view showing a radiating conductor pattern of the antenna device of an electronic device according to various embodiments of the disclosure.

FIG. 6B is a development view showing the radiating conductor pattern 243 of the antenna device of an electronic device according to various embodiments of the disclosure.

Referring to FIG. 6B, the radiating conductor pattern 243 can be provided with a power signal through a cable 205, for example, a coaxial cable. For example, an inner conductor of the cable 205 is connected to the power supply end 243a and an outer conductor of the cable 205 is connected to the grounding end 243b, so the radiating conductor pattern 243 can operate as a radiating conductor of the antenna device. A connection element such as a connection pad, a C-clip, or a wire for electrically connecting the cable 205 and the radiating conductor pattern 243 to each other may be disposed in the radiating carrier (for example, the radiating carrier 241 shown in FIG. 6A).

Figure 7:
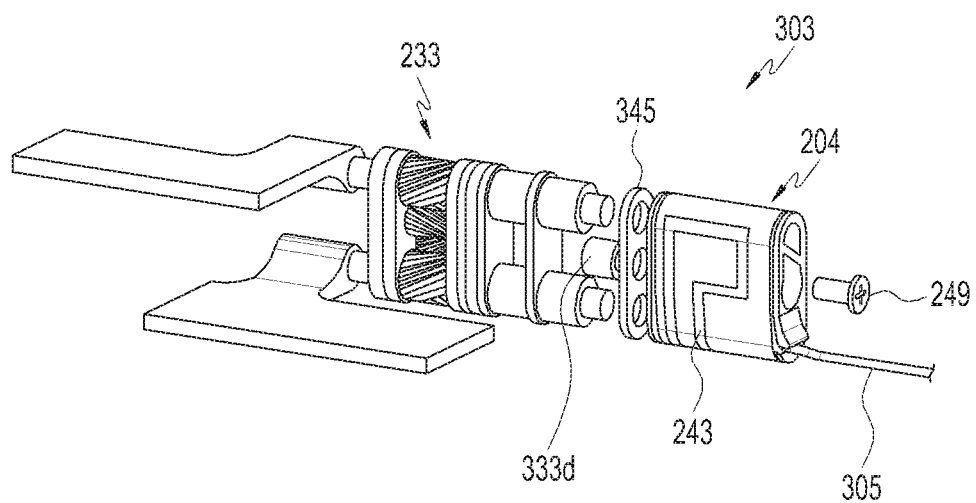
FIG. 7 is an exploded perspective view showing another example of a hinge assembly of an electronic device according to various embodiments of the disclosure.
Figure 8:
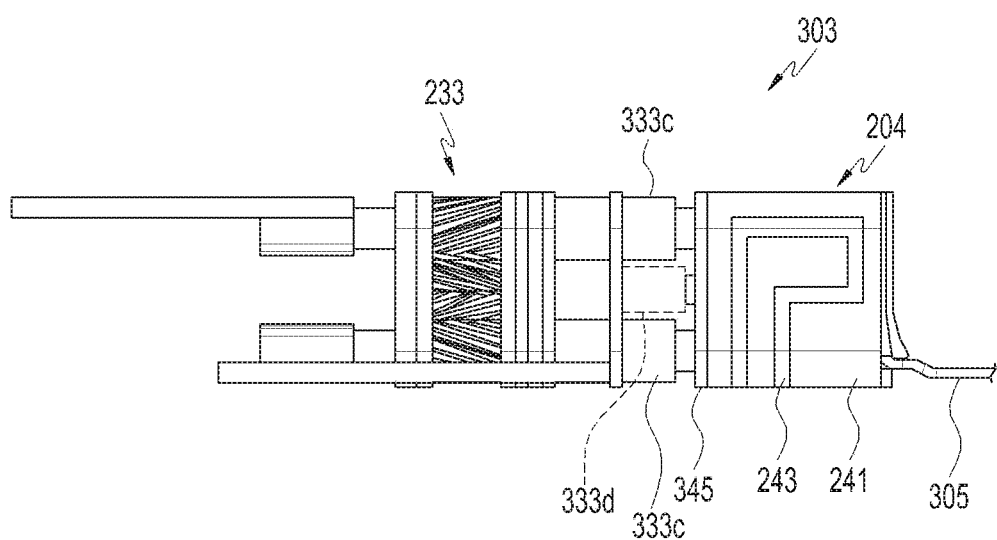
FIG. 8 is a plan view showing the example of a hinge assembly of an electronic device according to various embodiments of the disclosure.

FIG. 7 is an exploded perspective view showing another example 303 of a hinge assembly of an electronic device according to various embodiments of the disclosure. FIG. 8 is a plan view showing the example of a hinge assembly 303 of an electronic device according to various embodiments of the disclosure.

In the following description of embodiment(s), configurations that are the same as those in the previous embodiments or can be easily achieved from the previous embodiments are given the same reference numerals as those in the previous embodiments or omitted, and the detailed description may also be omitted.

Referring to FIGS. 7 and 8, a hinge assembly 303 of an electronic device according to various embodiments may include a bracket 345 for connecting the ground of the antenna device 204 to an electric conductor portion. The antenna device 204 can be electrically connected to a radio frequency (RF) module (not shown) of the electronic device (for example, the electronic device 100 shown in FIG. 1) through the cable 305 (for example, a coaxial cable). A communication interface (not shown) of the electronic device 100 may include a cellular module, a Wi-Fi module, a Bluetooth (BT) module, a global navigation satellite system (GNSS) module, and/or a near field communication (NFC) module, as well as the RF module.

In an embodiment, the bracket 345 may be a portion of the ground patch (for example, the ground patch 245 shown in FIG. 4) of the antenna device 204 or may be disposed to be in contact with a ground patch (for example, the ground patch 245 shown in FIG. 4) disposed in advance on the antenna device 204. In an embodiment, the bracket 345 may have at least one or more holes, and the hinge module 233 and the antenna device 204 may be electrically connected with each other by connecting coupling protrusions 333c or connecting member 333d of the hinge module 333 (for example, the holes). For example, the coupling protrusion 333c and/or the connecting member 333d may be made of an electrically conductive material. Accordingly, the bracket 345 may be used as a mounting plate that connects the ground of the antenna device 204 to the electric conductor portion of the hinge module 233 and coupling the antenna device 204 and the hinge module 233 to each other.

In an embodiment, the hinge module 233 and/or the antenna device 204 may further include a fastener 249 and the fastener 249 can be fastened to the connecting member 333d. In an embodiment, the fastener 249 can fix the bracket 345 in a close contact state to a side (for example, the first surface F1 shown in FIG. 6) of the antenna device 204. For example, as the fastener 249 is fastened to the connecting member 333d, the bracket 345 can be in closer contact with a side of the antenna device 204. Accordingly, the bracket 345 can be used at the ground patch of the antenna device 204 or may be fixed in contact with the ground patch on a side of the antenna device 204.

Figure 9:
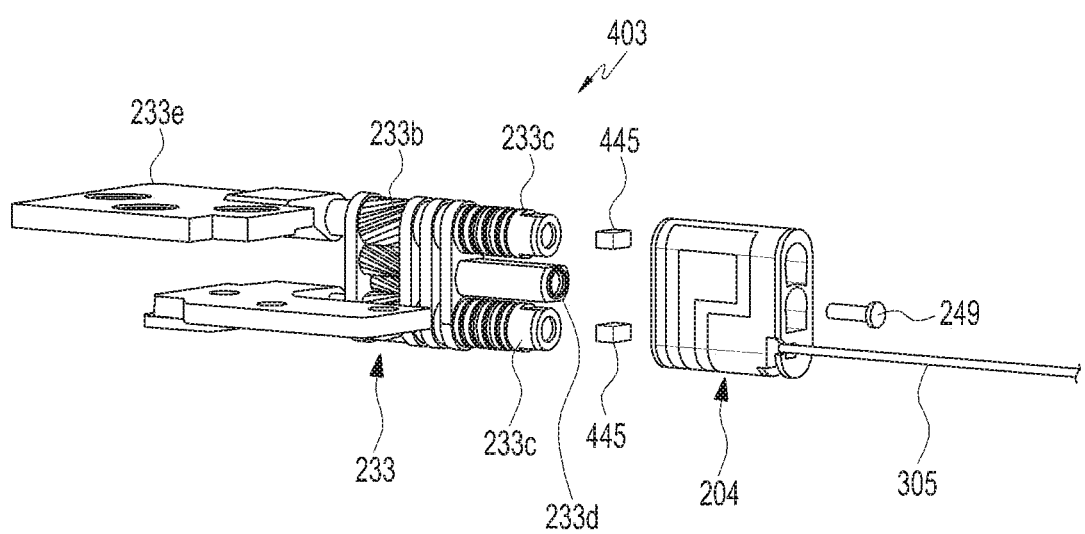
FIG. 9 is a perspective view showing another example of a hinge assembly of an electronic device according to various embodiments of the disclosure.

FIG. 9 is a perspective view showing another example of a hinge assembly of an electronic device according to various embodiments of the disclosure.

Referring to FIG. 9, an elastic member 445 may be used to electrically connect the ground patch of the antenna device 204 to the electric conductor portion of the hinge assembly 403 and/or the hinge module 233. The electric conductor portion of the hinge module 233 may include, for example, the gear(s) 233b, the coupling protrusion(s) 233c, and the fastening pieces 233e. In an embodiment, the elastic member 445 may be made of, for example, electrically conductive rubber and may be disposed with a first side in contact with the antenna device 204 (for example, the ground patch) and a second side in contact with the electric conductor portion of the hinge module 233. For example, the elastic member 445 may be disposed with the second side in contact with the coupling protrusions 233c and/or the connecting member 233d. According to an embodiment, the elastic member 445 may be fixed in a casing (for example, the casing 231 shown in FIG. 4). In an embodiment, the elastic member 445 may be fixed to a separation wall (for example, the separation wall 231a shown in FIG. 4) of a casing.

According to various embodiments, the antenna device 204 may be fastened and fixed to the hinge module 233 by the fastener 249. The fastener 249, for example, may include a screw and can be fastened to the hinge module 233 (for example, the connecting member 233d) outside the antenna device 204 with the head supported in the antenna device 204. Since the fastener 249 is thread-fastened to the hinge module 233, the gap between the hinge module 233 and the antenna device 204 is reduced by a predetermined amount and the elastic member 445 can be compressed between the hinge module 233 and the antenna device 204. For example, as the elastic member 445 is compressed, the electrical connection between the ground patch (for example, the ground patch 245 shown in FIG. 2) of the antenna device 204 and the hinge module 233 can be stably maintained.

A voltage standing wave ratio (VSWR) of an antenna device (for example, the antenna device 204 shown in FIG. 4) was measured in an electronic device manufactured to be used in a wireless local area network (WLAN) of a 2.4 GHz and/or 5 GHz band in accordance with various embodiments, and according to the measured result, the volume could be reduced by 0.7 cc, as compared with common antenna devices having the same performance. For example, it was found that, as compared with a common antenna device having a volume of 1.8 cc, the antenna device of an electronic device according to various embodiments has a volume of about 1.1 cc and shows the same performance as that of the common antenna device.

Further, when an antenna device of an electronic device according to various embodiments was manufactured to have a volume that is the same as or similar to common antenna devices, the radiation efficiency was improved maximally by about 15%. The result of measuring the radiation efficiency of the antenna device is shown as a graph in FIG. 10.

Figure 10:
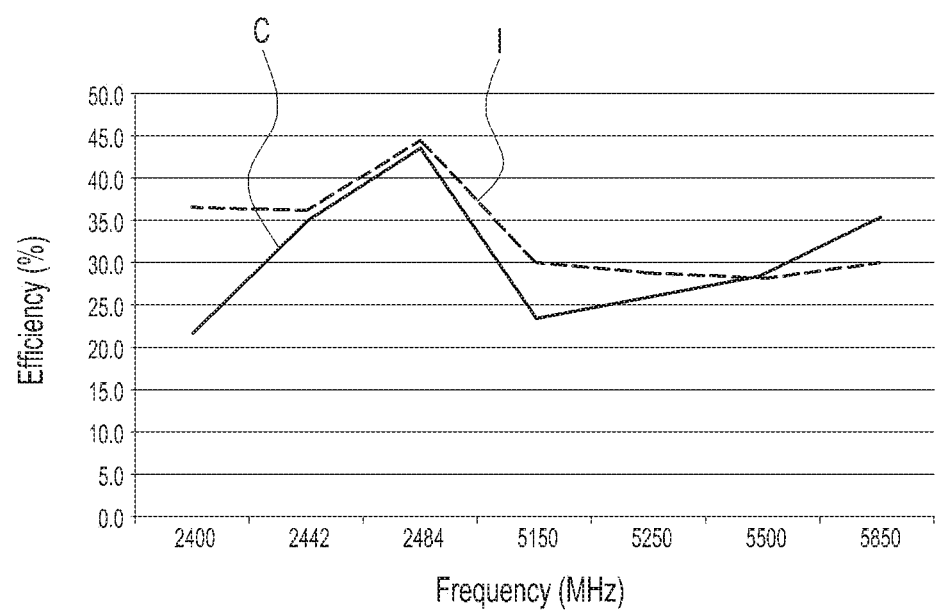
FIG. 10 is a graph showing radiation efficiency measured from an antenna of an electronic device according to various embodiments of the disclosure.

FIG. 10 is a graph showing radiation efficiency measured from an antenna of an electronic device according to various embodiments of the disclosure.

Referring to FIG. 10, the graph indicated by 'I' shows the radiation efficiency of the antenna device according to various embodiments and the graph indicated by 'C' shows the radiation device of a common antenna device having a volume that is the same as or similar to that of the antenna device according to various embodiments.

As described above, in an electronic device according to various embodiments, since an antenna device is disposed on a hinge assembly and the ground of the antenna device is expanded using the electric conductor portion of a hinge assembly, it is possible to reduce the size of an antenna device. According to an embodiment, as compared with common antenna devices, it is possible to secure improved radiation performance of the antenna device. In an embodiment, since the antenna device can be disposed on a hinge assembly and radiate a predetermined amount of wireless electric waves to a free space even if the housings of an electronic device are made of metallic materials, it is possible to secure a stable operation environment.

As described above, an electronic device according to various embodiments may include: a first housing; a second housing configured to be rotatably combined with the first housing; hinge assemblies configured to each at least partially have an electric conductor portion and rotatably couple the second housing to the first housing; and antenna devices coupled to the hinge assemblies, in which the antenna devices each may include a radiating conductor pattern and a ground patch, and the ground patches may be electrically connected to the electric conductor portions of the hinge assemblies.

According to various embodiments, the hinge assembly may include: a casing made of synthetic resin; a separation wall configured to divide the inside of the casing into a first space and a second space; and a hinge module configured to be at least partially received in the first space, in which at least a portion of the hinge module may be the electric conductor portion.

According to various embodiments, the antenna device may be received in the second space. According to various embodiments, the hinge assembly may further include a connecting member disposed through the separation wall, the antenna device may be received in the second space, and the connecting member may connect the ground patch to the electric conductor portion of the hinge module.

According to various embodiments, at least one of the radiation conductor pattern and the ground patch may be formed in the second space. According to various embodiments, the antenna may further include a radiating carrier configured to having a first surface facing the electric conductor portion of the hinge assembly, a second surface spaced from the first surface opposite to the first surface, and a side at least partially surrounding a space between the first surface and the second surface, and the ground patch may be disposed on the first surface.

According to various embodiments, the side may have a first area defined in a predetermined direction and a second area defined in a direction different from the first area, and the radiating conductor pattern may be disposed on the first area and the second area or may be disposed on one area selected from the first area and the second area.

According to various embodiments, the antenna device may further include a connection member disposed on the second surface. According to various embodiments, the hinge assembly may include: a casing made of synthetic resin; a separation wall configured to divide the inside of the casing into a first space and a second space; and a hinge module configured to be at least partially received in the first space, in which at least a portion of the hinge module may be the electric conductor portion.

According to various embodiments, the radiating carrier may be received in the second space with the first surface facing the separation wall. According to various embodiments, the hinge assembly may further include a connecting member disposed through the separation wall, and the radiating carrier may be received in the second space and the ground patch may be connected to the electric conductor portion of the hinge module through the connecting member.

According to various embodiments, the antenna device may further include a fastener fastened to the connecting member through the first surface. According to various embodiments, the electronic device may further include a bracket configured to be coupled to the antenna device in contact with the ground patch, and the bracket may electrically connect the ground patch to the electric conductor portion of the hinge assembly by being mounted on the hinge assembly.

According to various embodiments, the antenna may further include a radiating carrier configured to having a first surface facing the electric conductor portion of the hinge assembly, a second surface spaced from the first surface opposite to the first surface, and a side at least partially surrounding a space between the first surface and the second surface, and the ground patch may be disposed on the first surface.

According to various embodiments, the bracket may include a mounting plate coupled to face the first surface, and the mounting plate may be coupled to the electric conductor portion of the hinge assembly. According to various embodiments, an electronic device may include: a first housing; a second housing configured to be rotatably combined with the first housing; hinge assemblies configured to each at least partially have an electric conductor portion and rotatably couple the second housing to the first housing; and an antenna device configured to have a radiating conductor pattern, in which the hinge assemblies each may include a casing configured to receive the antenna device, and the electric conductor portions of the hinge assemblies and the antenna devices may be electrically connected to each other.

According to various embodiments, the casing may have: a first space defined to receive at least the electric conductor portion; a second space defined to receive the antenna device; and a separation wall formed between the first space and the second space.

According to various embodiments, the radiating conductor pattern may be formed in the casing. According to various embodiments, an electronic device may include: a first housing; a second housing configured to be rotatably combined with the first housing; hinge assemblies configured to each at least partially have an electric conductor portion and rotatably couple the second housing to the first housing; and an antenna device configured to have a radiating conductor pattern, in which the hinge assemblies each may include a connecting member configured to be coupled to the antenna device, and the electric conductor portions of the hinge assemblies and radiating conductor patterns of the antennas may be electrically connected to each other through the connecting members.

According to various embodiments, the antenna may further include: a radiating carrier configured to having a first surface facing the electric conductor portion of the hinge assembly, a second surface spaced from the first surface opposite to the first surface, and a side at least partially surrounding a space between the first surface and the second surface; and a ground patch disposed on the first surface, in which a portion of the radiating conductor pattern may be disposed on the first surface to corresponding to the ground patch, and the connecting member may be electrically connected to the radiating conductor pattern by coming in contact with the ground patch.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a first housing;
   a second housing;
   at least one hinge assembly including an electric conductor portion, the at least one hinge assembly rotatably coupling the second housing to the first housing; and
   at least one antenna device coupled to the at least one hinge assembly,
   wherein the at least one hinge assembly is rotatably coupled to:
      the first housing at a first hinge axis, and
      the second housing at a second hinge axis,
   wherein the first hinge axis is in parallel with the second hinge axis,
   wherein the at least one antenna device includes a radiating conductor and a ground patch, the radiating conductor including a radiating conductor pattern,
   wherein the ground patch is electrically connected to the electric conductor portion of the at least one hinge assembly,
   wherein the at least one hinge assembly includes:
      a casing,
      a separation wall for dividing the inside of the casing into a first space and a second space, and
      a hinge module configured to be at least partially received in the first space, and
   wherein at least a portion of the hinge module is the electric conductor portion.

2. The electronic device of claim 1, wherein the casing is made of synthetic resin.

3. The electronic device of claim 1, wherein the at least one antenna device is disposed in the second space.

4. The electronic device of claim 1,
   wherein the at least one hinge assembly further includes a connecting member disposed through the separation wall,
   wherein the at least one antenna device is received in the second space, and
   wherein the connecting member connects the ground patch to the electric conductor portion of the hinge module.

5. The electronic device of claim 1, wherein at least one of the radiation conductor pattern or the ground patch is formed in the second space.

6. The electronic device of claim 1,
   wherein the at least one antenna device further includes a radiating carrier including a first surface facing the electric conductor portion of the at least one hinge assembly, a second surface spaced from the first surface opposite to the first surface, and a side at least partially surrounding a space between the first surface and the second surface, and
   wherein the ground patch is disposed on the first surface.

7. The electronic device of claim 6,
   wherein the side has a first area defined in a predetermined direction and a second area defined in a direction different from the first area, and
   wherein the radiating conductor pattern is disposed on the first area and the second area or is disposed on one area selected from the first area and the second area.

8. The electronic device of claim 6, wherein the at least one antenna device further includes a connection member disposed on the second surface.

9. The electronic device of claim 6,
   wherein the at least one hinge assembly includes:
      a casing made of synthetic resin,
      a separation wall configured to divide the inside of the casing into a first space and a second space, and
      a hinge module configured to be at least partially received in the first space, and
   wherein at least a portion of the hinge module comprises the electric conductor portion.

10. The electronic device of claim 9, wherein the radiating carrier is received in the second space with the first surface facing the separation wall.

11. The electronic device of claim 9,
   wherein the at least one hinge assembly further includes a connecting member disposed through the separation wall, and
   wherein the radiating carrier is received in the second space and the ground patch is connected to the electric conductor portion of the hinge module through the connecting member.

12. The electronic device of claim 11, wherein the at least one antenna device further includes a fastener fastened to the connecting member through the first surface.

13. The electronic device of claim 1, further comprising:
a bracket for coupling to the at least one antenna device in contact with the ground patch,
wherein the bracket electrically connects the ground patch to the electric conductor portion of the at least one hinge assembly by being mounted on the at least one hinge assembly.

14. The electronic device of claim 13,
wherein the at least one antenna device further includes a radiating carrier configured to include:
a first surface facing the electric conductor portion of the at least one hinge assembly,
a second surface spaced from the first surface opposite to the first surface, and
a side at least partially surrounding a space between the first surface and the second surface, and
wherein the ground patch is disposed on the first surface.

15. The electronic device of claim 14,
wherein the bracket includes a mounting plate coupled to face the first surface, and
wherein the mounting plate is coupled to the electric conductor portion of the at least one hinge assembly.

16. The electronic device of claim 1,
wherein the at least one hinge assembly includes a casing for receiving the at least one antenna device, and
wherein the electric conductor portion of the at least one hinge assembly and the at least one antenna device are electrically connected to each other.

17. The electronic device of claim 16, wherein the casing comprises:
the first space for receiving at least the electric conductor portion,
the second space for receiving the at least one antenna device, and
the separation wall formed between the first space and the second space.

18. The electronic device of claim 16, wherein the radiating conductor pattern is formed in the casing.

19. The electronic device of claim 1,
wherein each of the at least one hinge assembly includes one or more connecting members for coupling to the at least one antenna device, and
wherein the electric conductor portion of the at least one hinge assembly and the radiating conductor pattern of the at least one antenna device are electrically connected to each other through the one or more connecting members.

20. The electronic device of claim 19,
wherein the at least one antenna device further includes:
a radiating carrier including a first surface facing the electric conductor portion of the at least one hinge assembly, a second surface spaced from the first surface opposite to the first surface, and a side at least partially surrounding a space between the first surface and the second surface, and
a ground patch disposed on the first surface, and
a portion of the radiating conductor pattern disposed on the first surface to correspond to the ground patch, and
wherein the one or more connecting members are electrically connected to the radiating conductor pattern by coming in contact with the ground patch.

21. The electronic device of claim 20,
wherein the one or more connecting members each comprises a cable including:
an inner conductor connected to a power supply, and
an outer conductor connected to the ground patch.

* * * * *